April 27, 1926.
R. SIEGFRIED
1,582,698
FLEXIBLE DRIVE
Filed Jan. 22, 1924
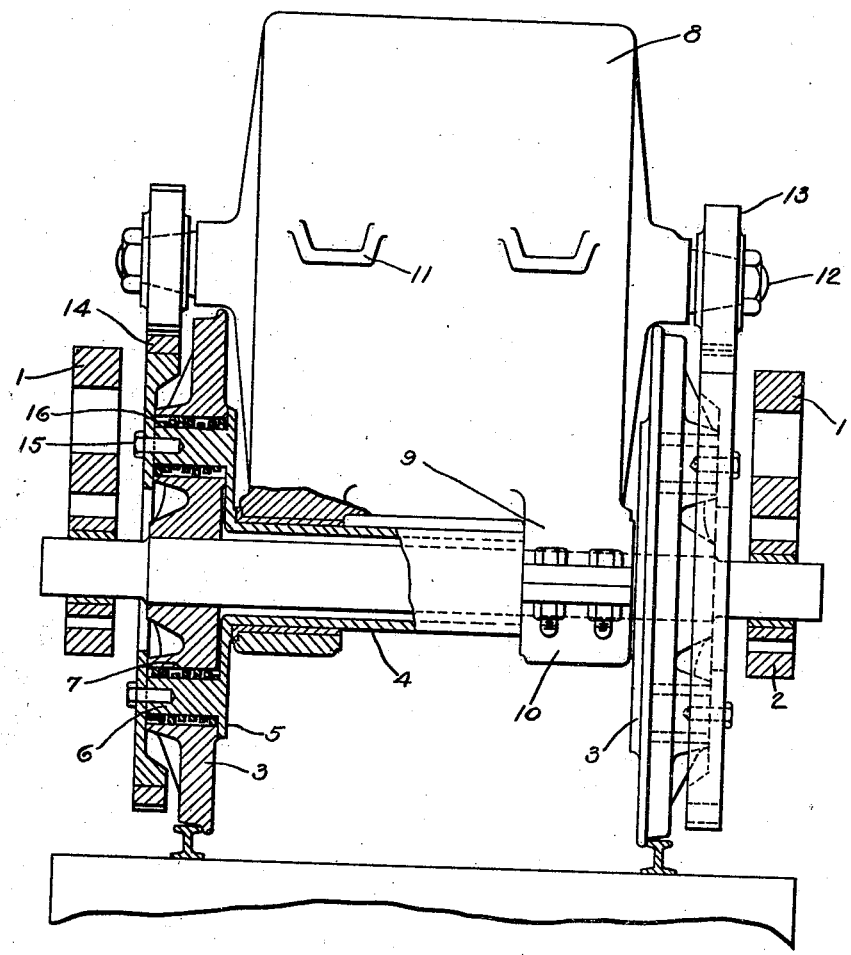
WITNESSES:
INVENTOR
Robert Siegfried.
BY
ATTORNEY Patented Apr. 27, 1926.

1,582,698

UNITED STATES PATENT OFFICE.

ROBERT SIEGFRIED, OF CARRICK, PENNSYLVANIA, ASSIGNOR TO WESTINGHOUSE ELECTRIC & MANUFACTURING COMPANY, A CORPORATION OF PENNSYLVANIA.

FLEXIBLE DRIVE.

Application filed January 22, 1924. Serial No. 687,881.

*To all whom it may concern:*

Be it known that I, ROBERT SIEGFRIED, a citizen of the United States, and a resident of Carrick, in the county of Allegheny and State of Pennsylvania, have invented a new and useful Improvement in Flexible Drives, of which the following is a specification.

My invention relates to electrical railway vehicles, more especially to motor drive mechanisms therefor embodying resilient connections between the driving motor and the wheel axles.

It is among the objects of my invention to provide an electric-motor drive mechanism for railway vehicles which shall be of simple, compact and durable mechanical construction.

It is another object of my invention to provide a positive and secure seat for the motor housing relative to the wheel axle to insure maintenance of gear-center distances.

It is still another object to provide a resilient connection of improved type between the motor armature shaft and the driven wheel axles.

Various types of motor drives embodying resilient connections between the driving and the driven members have been heretofore proposed, the common form of which comprises a flexible gear element embodying resilient members such as coil or leaf springs that absorb the impulses and shocks of the driven wheels, with the object of protecting the more sensitive bearings and windings of the motor.

My present invention is directed to a flexible connecting medium for the driving motors and driven wheels which embodies quill or sleeve members having one or more gear-wheels secured to the ends thereof and having resilient connections to the wheels of the driven axles. This type of construction provides a firm and secure mounting for the motor housing, which is journalled on the quill at one end, and permits of certain relative movement of the several co-operating parts, thus providing adequate resilience to absorb the shock and excessive stresses incidental to operating conditions. In other words, this structure permits variation of the normal rate of rotative movement of the motor shaft and axle.

In the accompanying drawing constituting a part hereof and in which like reference characters designate like parts:

The single figure is a view, partially in elevation and partially in cross-section, of a motor drive mechanism embodying the principles of my invention.

The structure herein illustrated comprises the usual side frames 1, which are adapted to journal wheel axles 2 in the usual manner, as by journal box and pedestal mountings, the axles 2 being provided with flanged wheels 3. A doubly flanged sleeve or quill 4 is disposed about the axle 2 and is provided at each flanged portion 5 with longitudinally extending lugs 6, which project through openings 7 that are provided in the wheel members.

A motor 8, which is provided with extending side bearings 9, is journalled on the quill 4 in the manner shown, the motor side of the bearings being placed on the upper portion of the quill and secured thereto by bearing caps 10. The motor 8 is further provided with side mounting lugs 11 by which it may be secured to a transom or cross tie (not shown) of the vehicle frame 1. This connection may be of the usual spring-borne type.

The armature shaft 12 of the motor is provided wtih pinions 13 at its respective ends which co-operatively engage a pair of gear-wheels 14 that are secured by bolts 15 to the lugs 6 of the quill 4. A plurality of resilient elements, such as coil springs 16, are disposed around the lugs 6 to provide a resilient connection between the quill 4 and wheels 3. The spring elements 16 are distorted, as shown, for the purpose of obtaining an irregular bearing in the openings 7 of the wheels, thereby permitting resiliently restrained movement of the quill and wheels.

In operation, this type of mounting and drive mechanism provides resilience between the armature shaft 12 and the wheel axle 2 that is essential to the protection of the motor parts because of the pounding of the wheels on the rails and the thrust and torsional impulses of the gear-wheel members.

It is evident from the above description of my invention that a motor drive mechanism constructed in accordance therewith, provides a practical, durable and efficient drive for railway vehicles that is readily adapted to standard practice.

Although I have described a specific embodiment of my invention, it will be obvious to those skilled in the art that various modifications may be made in the structural details and in the size and proportions of the relative parts without departing from the principles herein set forth.

I claim as my invention:—

1. A flexible drive mechanism comprising a driving motor, a wheeled axle, a quill disposed on said axle having a flanged end provided with projections extending into recessed portions of a wheel of said axle, co-operating gear-wheels respectively mounted on one end of the motor shaft and secured to the projections of said quill, and resilient means interposed between said quill and said wheel.

2. A flexible drive mechanism comprising a driving motor, a wheeled axle, a quill disposed on said axle having flanged ends provided with projections extending into recessed portions of the wheels of said axle, co-operating gear-wheels mounted on the respective ends of the motor shaft and secured to the corresponding projections of said quill, and helical springs disposed around the projections of said quill in the recesses of said wheels.

3. A flexible drive mechanism comprising a driving shaft and a wheeled axle in side-by-side relation, a quill disposed around said axle, means for resiliently connecting said quill and driven shaft, and means for connecting said quill and said driving shaft, said last named means comprising cooperating gear wheels disposed on the outside of the wheels of said axle.

4. A flexible drive mechanism comprising a driving shaft and a wheeled axle in side-by-side relation, a quill disposed around said axle, co-operating gear-wheels respectively secured to said driving shaft and said quill on the outside of the wheels of said axle, and resilient means permitting variation in the relative normal rate of rotative movement of said shaft axle and gear-wheels.

In testimony whereof, I have hereunto subscribed my name this 12th day of January 1924.

ROBERT SIEGFRIED.